United States Patent [19]

O'Neill, Jr.

[11] 3,860,761

[45] Jan. 14, 1975

[54] DIGITAL PROGRESSIVELY CONTROLLED SWITCHING SYSTEM

[75] Inventor: John Francis O'Neill, Jr., Boulder, Colo.

[73] Assignee: Bell Telephone Laboratories, Incorporated, Murray Hill, N.J.

[22] Filed: June 14, 1973

[21] Appl. No.: 369,902

[52] U.S. Cl. ......... 179/18 J, 179/15 A, 179/15 AT, 179/15 BY, 179/18 FG, 179/18 G, 179/18 H

[51] Int. Cl. ......................... H04j 3/12, H04q 11/04

[58] Field of Search ....... 179/18 FG, 18 FD, 18 FA, 179/18 F, 18 G, 18 GF, 18 H, 18 AD, 18 AF, 15 A, 15 BY, 18.9, 15 AT

[56] References Cited

UNITED STATES PATENTS

| | | | |
|---|---|---|---|
| 3,073,907 | 1/1963 | Alterman | 179/18 FG |
| 3,111,560 | 11/1963 | Gatzert | 179/18 F |
| 3,603,737 | 9/1971 | Le Dohr | 179/15 BY |
| 3,781,485 | 12/1973 | Woodward | 179/18 FG |

*Primary Examiner*—David L. Stewart
*Attorney, Agent, or Firm*—H. R. Popper

[57] ABSTRACT

An electronic progressive switching system which can establish communication connections between telephones for transmitting digitally encoded speech information and interlaced control signals is disclosed. The system has a distributed control network, including line finders, selectors, and connectors, which network switches multiplexed digital data under control of dialed digits and a common system clock. Between the line fingers, selectors, and connectors, digitized speech (travelling in two directions) and control signals are carried on a single conductor transmission path during respective time phases. Within each line finder, selector or connector, separate paths are provided for the two directions of transmission. By providing a switching path which need only carry digital signals, rapid idle path hunting and call setup are achieved and the switching elements may all be fabricated through the use of integrated circuit technique.

26 Claims, 6 Drawing Figures

DIGITAL PROGRESSIVELY CONTROLLED SWITCHING SYSTEM

BACKGROUND OF THE INVENTION

This invention relates to communication systems and, in particular, to progressive control telecommunications switching systems.

Most switching systems which are being designed today, or are planned for the future, are of the common control type. Common control systems, in general, comprise an array of crosspoints forming a network, and a centralized control which operates the crosspoints in order to establish a switching path. This concentration of control has a serious disadvantage that a substantial amount of control is required regardless of line size. Therefore, common control design is not economical for small sized systems. In addition, common control systems usually have a maximum size-expansion limit which is determined by the capacity of the control. Beyond a predetermined point, further size expansion requires replacement of the control, which generally requires total replacement by a different system.

In order to alleviate some of the problems associated with common control systems, prior art circuits have been developed which utilize distributed or progressive control. Distributed control systems, in general, comprise a number of switching stages which combine both control and switching in each stage. Since control and switching are provided in coordinated amounts, distributed control systems are economical at small line sizes and have virtually unlimited growth potential. However, heretofore, all prior art systems have utilized electromechanical switches for the network — either the large-motion rotary switches of the Strowger type or the newer reed-relay switches. Electromechanical switches have the disadvantage that they require appreciable maintenance to assure reliable operation. Furthermore, the slow operating speed of mechanical switches places an upper limit on idle path hunting speeds. Since idle-path hunting is an essential feature in distributed control systems, the use of mechanical switches results in inefficient operation. Thus, it would be desirable to have an all-electronic distributed control system which could hunt at electronic speeds and did not use a mechanical switching train. Accordingly, it is an object of this invention to provide a communication switching system which is economical in both small and large line sizes.

It is another object of the present invention to provide a distributed control switching system which has improved reliability and ease of maintenance.

Another object is to provide a distributed control switching system which hunts at electronic speeds.

It is a further object of the present invention to provide a distributed control switching system which can switch both digitized speech and digital data.

SUMMARY OF THE INVENTION

The foregoing and other objects of my invention are achieved in one illustrative embodiment wherein totally electronic stepping switches transmit digitized speech with interlaced control signals. The illustrative embodiment is arranged as a distributed system in that a digital transmission path dedicated to a single call, is established stage by stage under control of dialed digits. Analog speech and control signals are digitized and multiplexed in a recurrent series of time phases onto a single conductor line by means of line circuits. The lines are connected to a switching network comprised of a plurality of switching stages, each of which switches only digital signals. Specifically the switching network is comprised of line finder units, selector units and connector units connected together to form a branching network. The line finder units operate to identify a service requesting line and connect it to a selector. Under control of a dialed digit, a selector unit chooses a group of outputs out of all outputs terminated on the selector and after the selection process is complete, the selector unit hunts over the outputs in the selected group and connects an idle output to the service requesting line. Two selectors may appear in tandem for 4-digit operation. Final selector unit outputs are connected to connector units by a cross-connect field. Connector units perform two selections under the control of two dialed digits to complete the switching process.

Each switching unit includes a two directional switching unit comprising one or more parallel-connected multiplexer-decoder pairs. A particular one of the multiplexer-decoder pairs is selected and thereafter that pair is controlled in parallel by a counter to perform a hunting operation.

The operations of the entire system are controlled and regulated by a system clock which defines five time phases in a repetitive sequence. Two time phases are devoted to passing speech information through the system from calling to called station and from called to calling station respectively. A third is used for passing dialed digit information through the system. The last two time phases carry control information which is used to set up connections and monitor the busy-idle status of the switching units.

DESCRIPTION OF THE DRAWING

The foregoing and other objects and features of my invention may be more clearly understood from a reading of the following description of the illustrative embodiment together with the drawing in which:

FIGS. 2, 3, 4, and 5 are to be connected.

GENERAL DESCRIPTION OF FIG. 1

Figure 1:
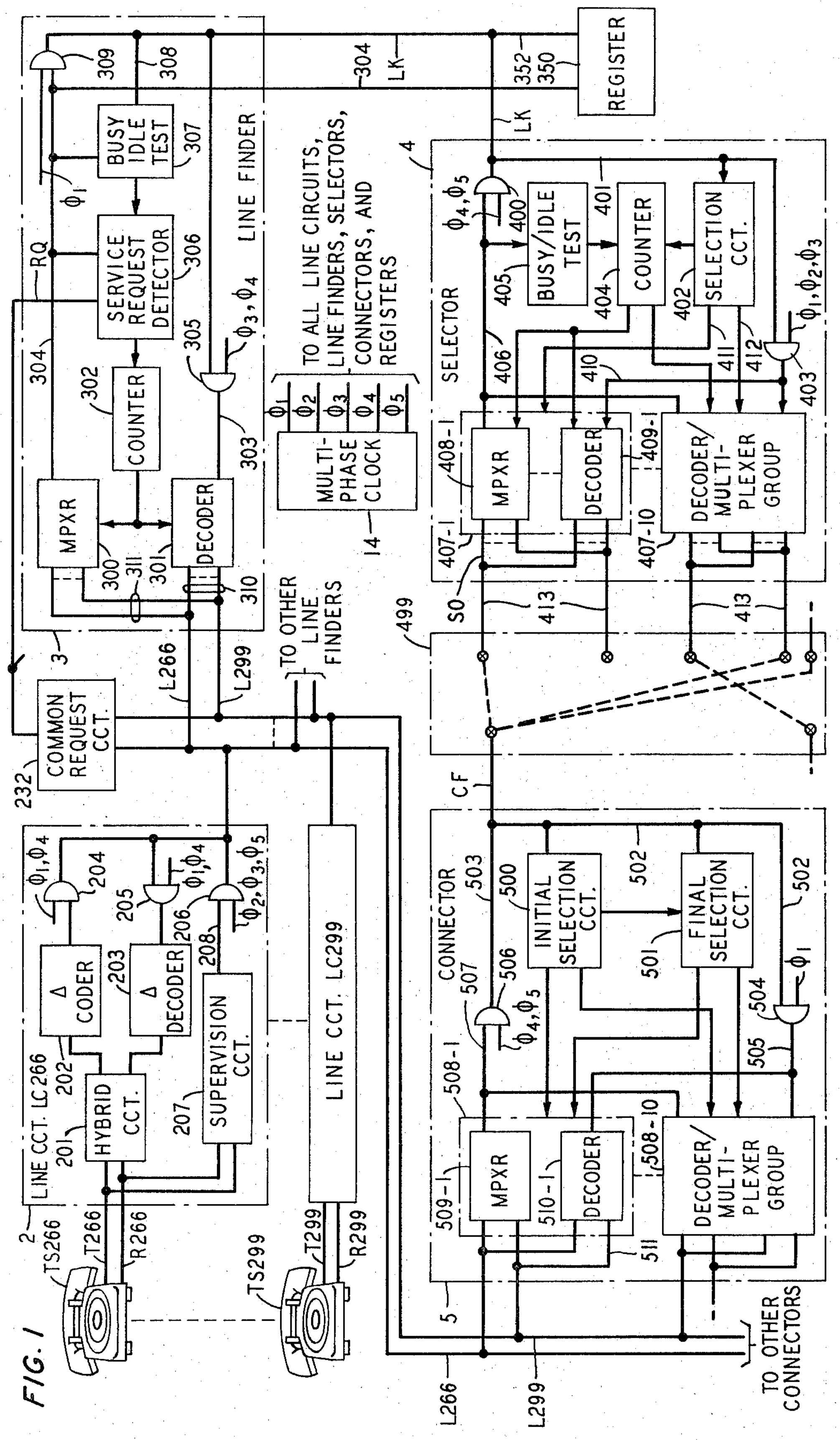
FIG. 1 shows a schematic block diagram of a progressively controlled switching system consisting of three stages, each stage including paired multiplexers and decoders.

FIG. 1 of the drawing shows a functional diagram of a progressive switching system which, in accordance with the principles of my invention, is adapted to provide telecommunications connections between a plurality of station sets, e.g., station sets TS266 and TS299. Each station set, TS266, TS299, is uniquely associated with a line circuit (line circuits LC266 and LC299, respectively). The station sets generate analog voice and supervisory information and the line circuits provide an interface between station sets TS266, TS299 and the switching network, including a line finder 3, selector 4, and connector 5. Line circuits LC266 and LC299 contain appropriate coding and decoding circuitry to convert analog voice supervision signals to and from digital signals. It is an aspect of my invention that the network passes speech and call signaling information in digital form. In addition, circuitry is provided in line circuits LC266, LC299 to enable coded voice and digital signals to be time multiplexed onto a single respective conductor line L266, L299.

Lines L266 and L299 controlled connected to a plurality of line signals of which only line finder 3 is shown. Other line finder circuits are substantially the same as line finder 3 and are omitted for clarity. Line finder 3 is called into operation to ascertain the identity of a service requesting line, (if at least one station is requesting service) by common request circuit 232. After the calling line identity has been determined, line finder 3 proceeds to establish a digital transmission path between the service requesting line and a single conductor link (LK) for the transfer of dialed digits from the calling station to register 350. Register 350 is adapted to receive and store digits and to control selector switch 4 and connector 5 pursuant to extending the digital transmission path from link LK to the called station.

Selector switch 4 and connector 5 comprise a progressive switching network which can select any called station under control of three dialed digits. Each dialed digit stored in register 350 actuates a respective selection circuit 402, 500, 501 in selector 4 or connector 5 to execute one stage of switching. Selector switch 4 is provided with a plurality of outputs, 413, which are divided into a series of groups (407-1, 407-10). Under control of the first dialed digit stored in the register, selector switch 4 selects one of the above-mentioned groups. An idle output in the selected group (e.g., output SO) is thereupon chosen by hunting circuitry in selector switch 4 and connected to link LK as hereinafter described.

All outputs of selector switch 4 are connected, via cross-connect field 499, to a plurality of connectors, of which only connector 5 is shown for clarity in FIG. 1. Two or more selector switch outputs, 413, may be connected to the input CF of a single connector since the aforementioned hunting circuitry contained in selector switch 4 only allows connection to outputs which are connected to an idle next stage.

Connector 5 is provided with a plurality of outputs arranged in groups (508-1, 508-10) in a manner similar to the outputs of selector switch 4. Each output of connector 5 is connected to a single line (e.g., line L266 or L299), although the outputs from a plurality of connectors (not shown) may be connected to a single line. Connector 5 is controlled by register 350, via the dialed digits stored therein, to perform two sequential selections. After the selections have been performed, connector 5 extends the digital path between its input CF and the selected output. Therefore, selector switch 4 and connector 5 establish a connection from link LK to the selected output after a series of three selections.

Although the illustrative embodiment of my invention in FIG. 1 of the drawing shows a three-stage switching network, it will be apparent to one of ordinary skill that more stages may be added to the network by simply placing additional selector switches in series with selector switch 4 and cross-connect field 499. Other arrangements for modifying the call handling capabilities may also be similarly designed and are well known.

The operations of the entire switching system are controlled and regulated by multiphase clock 14. Clock 14 has five outputs labled $\Phi_1$ through $\Phi_5$, which outputs are connected to each line circuit, line finder, selector, connector, and register.

Outputs $\Phi_1$ through $\Phi_5$ are enabled by clock 14 in such a manner that only one output is enabled at any given time and the outputs are enabled in a repetitive sequence. Outputs $\Phi_1$ through $\Phi_5$ therefore define a series of five time phases, of which each time phase corresponds to the period of time when one of the outputs $\Phi_1$ through $\Phi_5$ is in its high state. Each time phase will hereinafter be designated by its corresponding lead. Accordingly, any gate which has an input corresponding to a clock output $\Phi_1$ through $\Phi_5$ will be enabled during the corresponding time phase. For example, in FIG. 1, gate 204 in line circuit 2 has the clock outputs $\Phi_1$ and $\Phi_4$ as inputs, therefore gate 204 will be enabled during time phases $\Phi_1$ and $\Phi_4$.

According to the principles of my invention, certain switching operations are associated with each of the five time phases. However, to make efficient use of each time phase, the same time phase may be associated with several different switching operations depending on the progress of a call through the system. Thus, a signal on a given lead may represent call signaling information, digitized speech information, supervisory information, etc., depending on the location of the lead, the time in relation to the clock 14, and the status of the call at the particular moment.

In the illustrative embodiment time phase $\Phi_1$ is associated with the transfer of digital speech signals from the calling station to the called station. Two switching operations are associated with time phase $\Phi_2$. During the initial set up of a switching path through the network, call signaling information is passed from the calling station to the register and from the register to the selectors and connectors to control the selections which occur. After a switching path has been set up, call signaling information may travel over the path during time phase $\Phi_2$ through the system to control other switching systems or exchanges. Time phase $\Phi_3$ is associated with two different switching operations, depending on the status of the call and the system location considered. During initial phases of call setup, signals present on lines such as L266 and L299 and on leads in line finders such as line finder 3 are associated with service requests. In later phases of call setup, signals present in leads in selector 4 and connector 5 are used to seize an idle switching stage and indicate the idle or busy status of each switching stage. In addition, the actual switching selections are performed during time phase $\Phi_3$. Time phase $\Phi_4$ is associated with the transfer of speech information from the called station to the calling station. Finally, time phase $\Phi_5$ is associated with busy or idle status information of both the calling and called stations.

GENERAL DESCRIPTION OF A CALL BETWEEN STATION SETS

With reference to FIG. 1, the placing of an illustrative call between station set TS266 and station set TS299 is initiated when station set TS266 produces a service request by going off-hook and bridging conductors T266 and R266. This bridging causes supervision circuit 207 in line circuit 2 to produce a serivce request signal on lead 208 during time slot $\Phi_3$, which service request signal is forwarded through enabled gate 206 to line finder 3 via line L266. The service request signal on line L266 during time slot $\Phi_3$ is detected by common request circuit 232, which informs line finder 3 via lead RQ that a station is requesting service, although at this point the identification of the calling line has not been determined. Responsive to a signal from common request circuit 232, line finder 3 initiates the following request detection procedure to test each line which is terminated thereon for a service request signal. Assuming that line finder 3 is idle, the signal generated by common request circuit 232 is received via lead RQ at the service request detector circuit 306, which signal initiates hunting operations to ascertain the identity of the calling line. In the course of these hunting operations, each line that is terminated on line finder 3 (e.g., lines L266 and L299) is connected sequentially to lead 304 by multiplexer 300.

Specifically, each of the lines terminated on line finder 3 is connected both to multiplexer 300 and to decoder 301. Multiplexer 300 is an electronic selection device having a plurality of inputs 311 and a single output 304. Multiplexer 300 is responsive to control signals provided by an external circuit such as counter 302 to select one of its inputs and provide a connection to transfer digital signals between that input and its output. However, because of the internal construction of multiplexer 300, digital signals can only pass in one direction — from input to output. An example of a prior art multiplexer is shown in *The Integrated Circuits Catalog for Design Engineers*, First Edition, Texas Instruments, Inc. pp. 9–339. In order to provide the necessary two directions of transmission in line finder 3, a decoder 301 is connected in parallel to multiplexer 300. Decoder 301 is an electronic selection device which has a single input 303 and a plurality of outputs 310. In a similar fashion to multiplexer 300, decoder 301 can be controlled by external signals to establish a one-way path from its input to one of its outputs. In line finder 3, the inputs 311 of multiplexer 300 and the outputs 310 of decoder 301 are connected in parallel to the lines such as L266 and L299, thereby enabling information travelling in two directions on the lines to be transmitted through the line finder at different time instants. Multiplexer 300, upon receiving appropriate control signals from counter 302, sequentially connects each of its inputs (corresponding to each line terminated on line finder 3) to lead 304. Decoder 301, upon receiving control signals from counter 302, connects its input 303 sequentially to each of its outputs corresponding to each line, e.g., lines L266 and L299. Counter 302 controls multiplexer 300 and decoder 301 in parallel so that at any given time, the same line is connected to both leads 303 and 304.

In response to a signal from common request circuit 232 indicating that at least one station is requesting service, service request detector 306 controls counter 302 for advancing multiplexer 300 sequentially to connect each line appearing on line finder 3 to lead 304. Lead 304 is monitored by service request detector 306 during time phase $\Phi_3$ in order to detect service requests appearing on the lines. As discussed previously, a service request signal is present on line L266 due to an off-hook at station T266. Assuming in the illustrative example that no other lines are requesting service, multiplexer 300, under control of counter 302 and service request detector 306, will in the process of sequentially connecting each line to lead 304, connect line L266 to the multiplexer output lead 304. When line L266 is connected to lead 304, the service request signal on line L266 appears on lead 304 during time phase $\Phi_3$. Service request detector 306 detects the signal and thereupon controls counter 302 to stop the advance of multiplexer 300, leaving service requesting line L266 connected to multiplexer output lead 304. The service request signal on lead 304 informs register 350 that a service-requesting station has been identified.

Busy-idle test circuit 307 also monitors lead 304 during time phase $\Phi_3$. Upon detecting the service request signal, test circuit 307 disables service detector 306 so that the aforementioned hunting procedure will not be restarted when the service request signal is removed from line L266 as hereinafter described. In addition, busy-idle test circuit 307 produces a seizure signal during time phase $\Phi_3$ on lead 308, which signal appears on link LK and seizes selector switch 4. In accordance with the principles of my invention, the same seizure signal also is used to cancel the original service request signal generated by line circuit 2, so that no other line finders other than line finder 3 will improperly connect to line L266. Specifically, the seizure signal produced by busy-idle test circuit 307 appearing during time phase $\Phi_3$ on lead 308 appears as an input to gate 305. Gate 305 is enabled during time phase $\Phi_3$ and the seizure signal passes to the input 303 of decoder 301. Since decoder 301 is controlled in parallel with multiplexer 300 as previously mentioned, the input 303 of decoder 301 is connected to line L266, and thus the seizure signal appearing at decoder input 303 is communicated through decoder 301 and appears on line L266 during time phase $\Phi_3$. This seizure signal combines with the original service request signal to make line L266 look as if it were idle to any other line finders that might test line L266 for service requests. The seizure signal also resets common request circuit 232.

As previously mentioned, register 350 is informed of a service request via a service request signal on lead 304 during time phase $\Phi_3$. During time phase $\Phi_4$, register 350 returns delta coded dial tone to station set TS266 via lead 352, link LK, gate 305 and decoder 301 to line L266, and line circuit 2. Digitally coded tone is used to enable the tone to pass through line finder 3 which switches only digital information. In line circuit 2, dial tone is received by gate 205 and forwarded during time phase $\Phi_4$ to delta decoder 203. Decoder 203 converts the digital signals into analog tones which pass through hybrid circuit 201 to station set TS266.

Upon hearing the dial tone, the calling party at station set TS266 dials the three digits necessary to select a called station, for example, station set TS299. The dialed digits are detected and sampled by supervision circuit 207 for transmission to register 350. During time phase $\Phi_2$, the coded digits are passed to register 350 over the digital signal transmission path comprising gate 206, line L266, multiplexer 300, and lead 304. Gate 309 in line finder 3 is controlled by register 350 via a path not shown and prevents the dialed digits from getting on link LK and causing an erroneous selection in selector 4.

Register 350 detects and stores each digit and, after receiving the third digit, prepares selector 4 and connector 5 to select the desired called station and to establish calling connections. As previously mentioned, the transfer of coded dialed digit information between the register and selectors and connectors preparatory to making a path selection takes place during time phase $\Phi_2$. In order to prevent selector 4 and connector 5 from performing erroneous selections during their idle time periods, selection circuits 402, 500, and 501 are arranged to disregard any signals at their inputs until they receive an enable signal in time phase $\Phi_2$ from register 350. After receiving an enable signal a selection circuit will be enabled to receive and decode dialed digit information which is present at its input during successive time phases $\Phi_2$.

Specifically, during idle periods, register 350 places high signals on link LK via lead 352 during time phase 101 $_2$. These high signals are received by selection circuit 402 via lead 401 in selector 4, but selection circuit 402 does not respond to the signals until it receives the enable signal from register 350.

In order to transfer coded dialed digit information to selector 4, register 350 places a enable (low) signal on link LK, which signal acts as a prefix to allow selection circuit 402 to receive the coded digit information. At this time, selector 4 has not performed a selection so that the enable signal does not propagate beyond selector 4. Thus, only selection circuit 402 is enabled and can respond to signals present during time phase $\Phi_2$.

Register 350 next places a code corresponding to the first dialed digit on link LK, during time phase $\Phi_2$ which code propagates to enabled selection circuit 402 where the code is received and decoded. Selection circuit 402 controls the selector output groups (of which only groups 407-1 and 407-10 are explicitly shown) by means of leads 411 and 412. To perform a selection,, selection circuit 402 enables one group and disables the rest. After a selection has been performed, selection circuit 402 is disabled by busy-idle test circuit 405 to prevent it from responding to any call signaling information which may later pass through selector 4. Assuming, for the purposes of illustration, that group 407-1 is selected, selection circuit 402 subsequently controls counter 404 to perform a hunting operation as hereinafter described.

In FIG. 1, only group 407-1 is shown in detail. Group 407-10, and other groups which are not shown, have similar circuits to group 407-1 and therefore detail has been omitted for clarity.

The aforementioned hunting operation is performed by counter 404 operating in conjunction with multiplexer 408-1 and busy-idle test circuit 405. Specifically, output group 407-1 contains a multiplexer 408-1 and a decoder 409-1. In an analogous fashion to multiplexer 300 and decoder 301, as mentioned in the description of line finder 3, the inputs of multiplexer 408-1 and the outputs of decoder 409-1 are connected in parallel. Multiplexer 408-1 and decoder 409-1 are controlled simultaneously by counter 404 so that at any given time one output of selector 4 is connected both to the decoder input, lead 410, and to the multiplexer output, lead 406. This connection allows information to be passed from the decoder input 410 to an output lead of selector 4 and be passed from the same output lead of selector 4 to the output lead 406 of multiplexer 408-1 (during different clock phases, as earlier described).

After selection circuit 402 has enabled output group 407-1 as previously described, selection circuit 402 initiates counting operations in counter 404. These counting operations control multiplexer 408-1 and decoder 409-1 to sequentially connect each output in output group 407-1 simultaneously to leads 406 and 410. Lead 406 is monitored by busy-idle test circuit 405. By means of this arrangement, busy-idle test circuit 405 can sequentially monitor each of the output leads in group 407-1. Upon detecting a busy output, busy-idle test circuit 405 controls counter 404 to advance once. Upon detecting an idle state, busy-idle test circuit 405 stops counter 404. In this fashion, each output in group 407-1 is tested for a busy or an idle status. When an idle output is encountered, the hunting operation is discontinued and that output remains connected through multiplexer 408-1 to lead 406 and through decoder 409-1 to lead 410. This hunting operation completes the operation of the selector switch 4. Assume, for the purpose of illustration, that output lead SO is idle, and that selector switch 4, by means of the aforementioned hunting operation, has connected lead SO to leads 406 and 410.

The last stage in the illustrative switching network is connector 5. Under control of the second and third dialed digits, connector 5 performs two selections to complete switching operations in the communications network composed of selector 4 and connector 5. Connector 5 is connected to selector 4 via cross-connect field 499 as previously described in order to allow for different network configurations to accommodate different traffic loads. Connector 5 performs two sequential selection operations by first selecting one of its output groups (only groups 508-1 and 508-10 are shown) under control of the second dialed digit and finally selecting one output in the selected group under control of the third dialed digit.

The two selections performed by connector 5 are carried out under control of selection circuits 500 and 501. Register 350 controls selection circuits 500 and 501 in a manner similar to the aforementioned operation of selection circuit 402 in selector 4. In particular, to initiate the first of the two selections performed by connector 5, register 350 again places an enable signal on link LK, which signal enables selection circuits 500 to receive coded dialed digit information. As discussed previously, selection circuit 402 was disabled after selector 4 had completed its selection operation, and this selection circuit 402 does not become enabled at this time. The enable signal travels via link LK, lead 401, gate 403, decoder 409-1, lead SO, and lead 502 to selection circuit 500. Selection circuit 500 inhibits final selection circuit 501 from receiving the enable signal to prevent an erroneous double selection from occurring. Thus, only selection circuit 500 in connector 5 is fully enabled. Register 350 then sends a code corresponding to the second dialed digit in successive time phases $\Phi_2$ over the path enumerated above, which digit code is received and decoded in selection circuit 500, which performs a selection by enabling one of the connector output groups, 508-1 and 508-10, and disabling all other output groups.

After enabling a group such as group 508-1, selection circuit 500 disables itself to prevent any response to further dialed digits and activates selection circuit 501. Register 350 controls selection circuit 501 in response to the third dialed digit in a similar manner to cause selection circuit 501 to choose one output in the selected group. Assume, for illustrative purposes, the selected output is lead 511. As previously mentioned, each output of connector 5 is connected to one line. In FIG. 1, output lead 511 is connected to line L299 so that after the above switching operations have been completed a connection has been established between stations TS266 and TS299 via line finder 3, selector 4, and connector 5.

It is apparent from the foregoing description that register 350 actuates each selection circuit by placing an enable signal on link LK. Thus, although only one selector is shown in the illustrative example, it is clear that register 350 can control a plurality of such selectors to form a sequential connection of any length. Since each selection circuit such as circuit 402 must first be enabled in order to receive dialed digits, register 350 can choose a path through the network in a series of sequential selections by repetitively placing an enable code on link LK. The enable code merely passes through those switching stages which have previously made a selection and enables the selection circuit which follows the last circuit that has performed a selection.

DETAILED DESCRIPTION

Figures 2, 6:
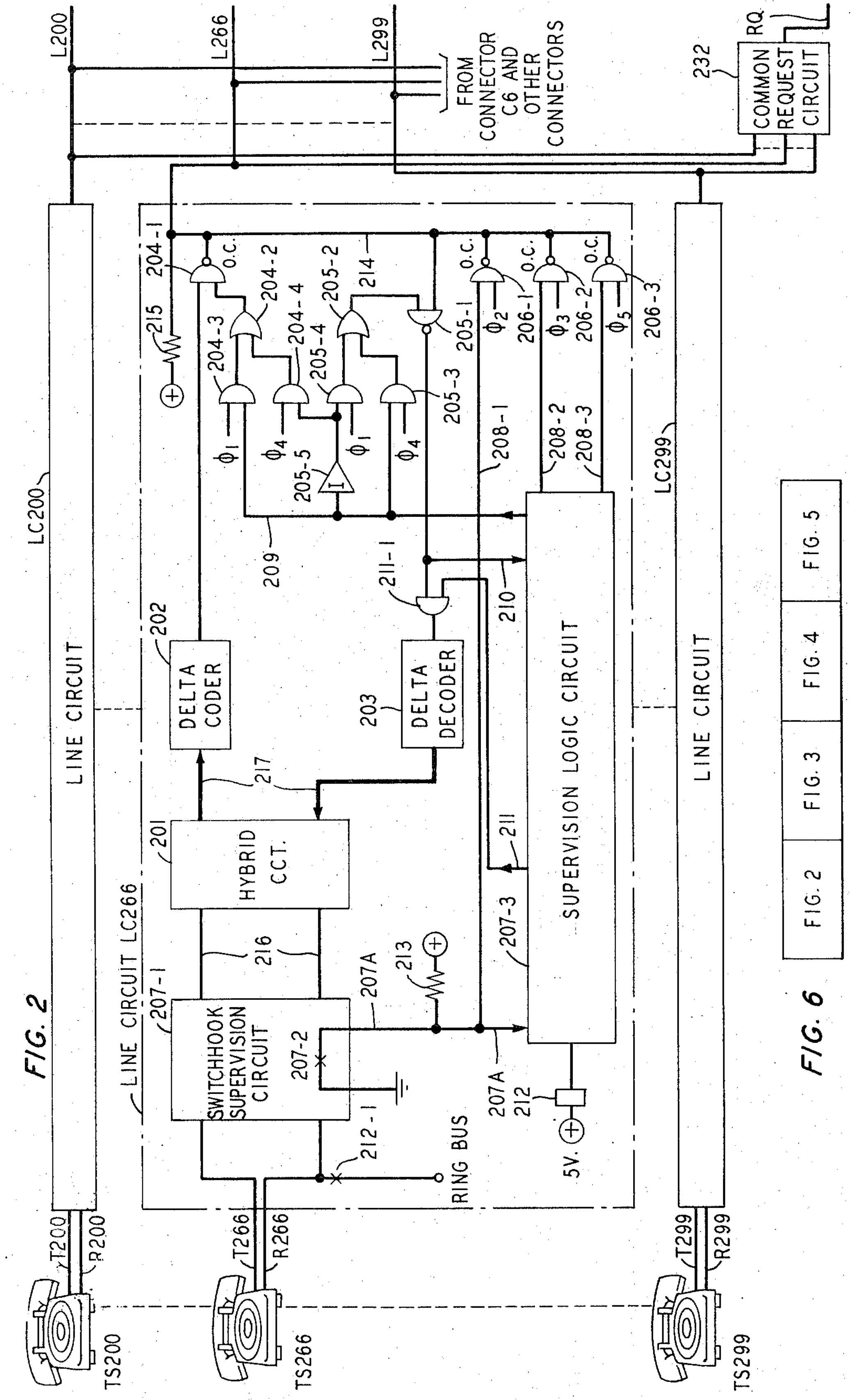
FIG. 2 is a schematic diagram of a line circuit which digitizes speech and control information.
FIG. 6 shows how

Turning now to FIG. 2, the specific circuitry used in the illustrative embodiment will be described in connection with an intercom call between telephone sets TS266 and TS299.

A. Initiation of a Service Request

FIG. 2 of the drawing shows a plurality of station sets TS200 through TS299, each connected to a respective line circuit LC200 through LC299 and line L200 through L299. Each line is connected to the common request circuit 232 which serves to inform the switching system when at least one line is requesting service. Only line circuit LC266 is shown in detail; equivalent circuitry in line circuits LC200 and LC299 has been omitted for clarity.

Line circuit LC266 receives analog speech and call signaling information from station set TS266 via conductors T266, R266. Line circuit LC266 processes the information and forwards it to line L266. The circuitry in line circuit LC266 can be divided basically into two major portions. One portion is the speech processing circuitry comprising hybrid circuit 201, delta coder 202, delta decoder 203, and the associated gates 204-1 to 204-4, and 205-1 to 205-5. This circuitry converts analog speech signals received from station set TS266 into digital code suitable for transmission through the switching network shown in FIGS. 3, 4, 5, which, as previously mentioned, switches only digital signals. In addition, the circuitry also converts digital code into analog signals.

Hybrid circuit 201 is a well-known device which converts the two-wire telephone line 216 into the four-wire line 217. Delta coder 202 is a digital encoding device, well known to those skilled in the art, which converts analog speech signals into coded digital signals. Similarly, delta decoder 203 is a well-known device for converting coded signals into analog signals suitable for conversion to audio sounds by station set TS266. Gates 204-1 to 204-4 and 205-1 to 205-5 determine whether line circuit LC266 transmits or receives encoded speech information in time phase $\Phi_1$ or time phase $\Phi_4$. Their operation under control of the supervision logic 207-3 via lead 209 will be described in detail later during another stage of call processing.

The other major portion of the circuitry in line circuit LC266 comprises the switchhook supervision circuit 207-1, supervision logic circuit 207-3, and associated gates 206-1 through 206-3. The supervision circuitry monitors the on-hook, off-hook status of station set TS266 and encodes this status into binay control signals which are suitable for controlling the switching network shown in FIGS. 3–5. Supervision logic 207-3 receives information at leads 207A and 210 indicating the status of station set TS266 and the status of line L266, respectively. On the basis of these inputs and the progress of the call, supervision logic circuit 207-3 controls ring relay 212 to apply ringing voltage to station set TS266, or controls leads 211, 208-2 and 208-3 to transfer information to and from line L266. The operation of supervision logic circuit 207-3 will hereinafter be described in further detail.

NAND gates 206-1 and 206-3, together with NAND gate 204-1, determine the transfer of information to line L266 during various time phases. Gates 206-1 to 206-3 and 204-1 are advantageously "open collector" or "bare collector" gates; that is, they do not have an active pull-up transistor in their output stage (all gates shown in FIGS. 2 through 5 of the drawing which are open collector gates are so designated by the letters O.C. near the output). Therefore, the outputs of two or more such gates may be connected together without logical contradiction. The lack of a pull-up transistor causes open collector gates to have only one active state — the low state, and thus an external pull-up resistor must be connected to the output of an open collector gate in order to provide a high output. An example of an open collector gate is shown in *The Integrated Circuits Catalog for Design Engineers*, Texas Instruments, Inc. p. 6—6.

Gates 204-1 and 206-1 to 206-3 are tied together by lead 214, in order to form a multiplexing structure in which a low signal produced at the output of any of the aforementioned gates will cause lead 214 to be placed in the low condition regardless of the state of the other gates. Clock 14 (shown in FIG. 1 of the drawing) provides high enabling signals to gates 206-1 to 206-3 and 204-1 by means of five outputs labeled $\Phi_1$ through $\Phi_5$. In order to transfer information to line L266 via lead 214, each of the gates is controlled to transfer information during one time phase. Lead 214 is placed in the low state during each of time phases $\Phi_1$ to $\Phi_5$ by a gate associated with that phase. Pull-up resistor 215 maintains lead 214 in the high state during any time phase if the gate enabled during that time phase is transmitting high or "1" data.

A customer originates a service request by placing a telephone set, for example, telephone set TS266, in the off-hook condition, which causes conductors T266 and R266 to be bridged. Switchhook supervision circuit 207-1 responds to the bridge by operating normally open contact 207-2, thereby grounding lead 207A which is normally held at positive potential by pull-up resistor 213. The ground potential causes supervision circuit 207-3 to initiate a series of operations resulting in a service request. Specifically, supervision logic circuit 207-3 places a low signal on lead 208-2. This low signal changes the output of NAND gate 206-2 from low to high during time phase $\Phi_3$, allowing pull-up resistor 215 to pull lead 214 and line L266 high during time hase $\Phi_3$. The high service request signal on line L266 is applied to common request circuit 232; in response thereto, circuit 232 places a high signal on lead RQ which signal initiates hunting operations in all line finders (FIGS. 3) to locate line L266.

Supervision logic circuit 207-3 also performs various other operations at this time in order to prepare line circuit LC266 for the next stages of call processing. In performing these other operations, supervision logic circuit 207-3 places a high signal on lead 211 in order to enable AND gate 211-1 to pass information from the output of gate 205-1 to delta coder 203 for subsequent decoding into speech signals. In addition, supervision logic circuit 207-3 places a low signal on lead 208-3, which signal is applied to gate 206-3, disabling it and allowing resistor 215 to pull line L266 high during time phase $\Phi_5$ to indicate that line circuit LC266 is busy. This busy signal will be used to indicate that station set TS266 is still busy after line L266 has been identified by a line finder as hereinafter described.

B. Detection of the Service Requesting Line

Figure 3:
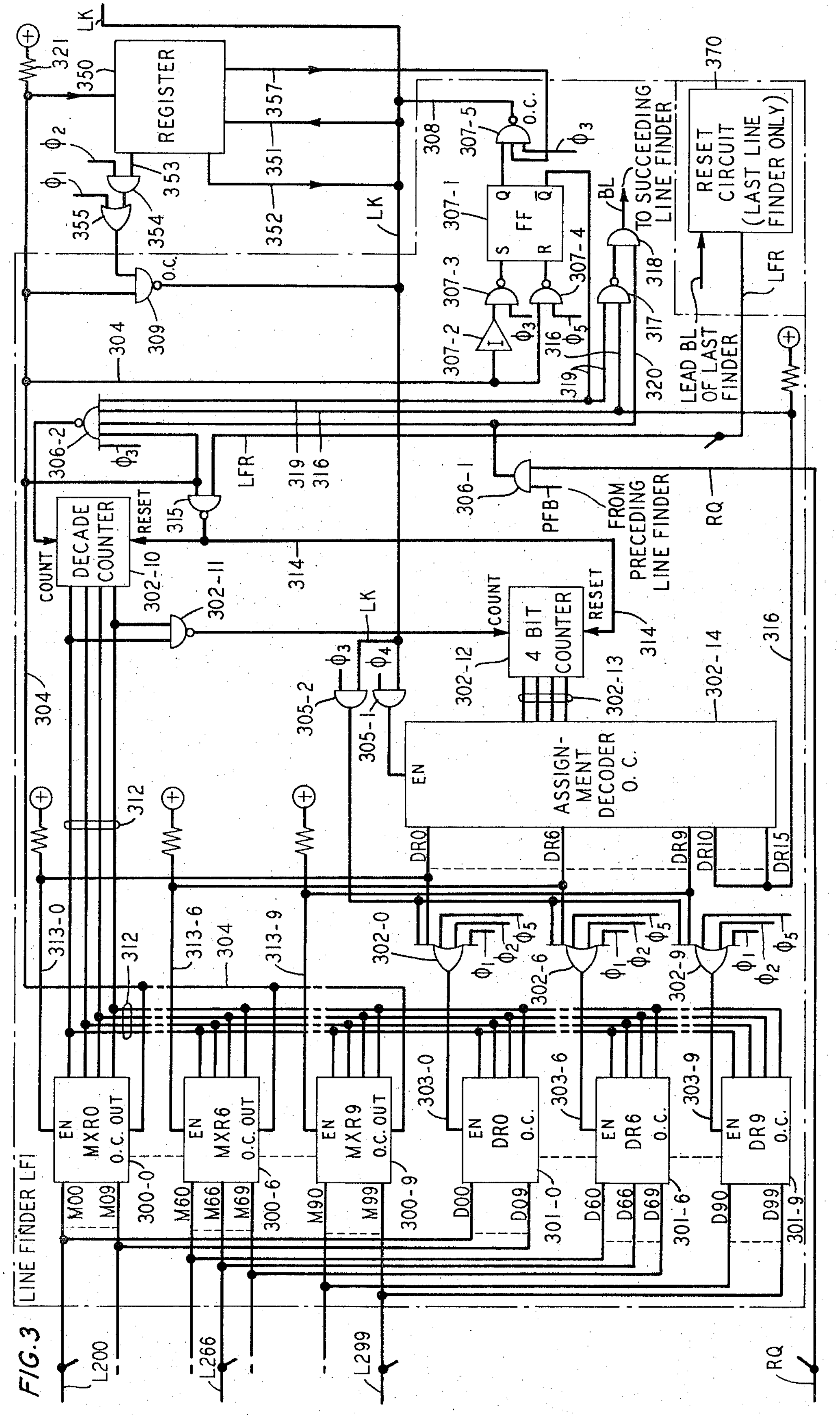
FIG. 3 illustrates a line finder which is used to process service requests and identify service requesting lines.

Detection of the service requesting line is accomplished by line finder circuits, of which one line finder (LF1) is shown in detail in FIG. 3 of the drawing. Line finder LF1 has a plurality of inputs which are multipled to lines L200 through L299 including line L266. Line finder LF1 is set into operation by the high signal on lead RQ and thereupon seeks to detect the service request high signal on line L266.

The high signal applied by common request circuit 232 in FIG. 2 to lead RQ is forwarded through AND gate 306-1 and NAND gate 306-2 in FIG. 3 to enable decade counter 302-10. AND gate 306-1 is part of a hunting chain which assigns line finder LF1 a position in a hunting sequence and enables line finder LF1 in turn. Finder LF1 is enabled when a high signal is applied to lead PFB from a preceding line finder (not shown) in the chain. A high on lead PFB together with the high on lead RQ causes gate 306-1 to apply a high signal to NAND gate 306-2. NAND gate 306-2 provides a signal to decade counter 302-10 during time phases $\Phi_3$ whenever all of its inputs (including the one from gate 306-1 and clock input $\Phi_3$) are high.

Decade counter 302-10 at its left-hand side controls the four binary code leads 312 which in turn apply signals to multiplexers 300-0 through 300-9 and decoders 301-0 through 301-9. Decade counter 302-10 increments its output by 1 each time a low pulse is received at its count input from the output of NAND gate 306-2 (during time phase $\Phi_3$) to produce a repetitive progression of signals corresponding to each of the binary numbers between 0000 through 1001 on code leads 312. A particular multiplexer-decoder pair will be enabled to respond to the code on leads 312 by assignment decoder 302-14 which selectively enables leads 313-0 through 313-9 and 303-0 through 303-9.

Under control of the four-bit code appearing on leads 312, the one of multiplexers 300-0 through 300-9 enabled by assignment decoder 302-14 will select one of its respective lines L200 through L299 for "connection" to common output lead 304. However, the signal appearing on the selected input line appears on lead 304 with inverted polarity. Multiplexers 300-0 to 300-9 include open collector output transistors which are disabled when idle and thus their outputs may all be connected to lead 304 without danger of logical disagreement. Lead 304 is normally held in the high state by pull-up resistor 321 but may be pulled low by the output of the particular multiplexer enabled by assignment decoder 302-14.

When decade counter 302-10 is set into operation by pulses from gate 306-2, each of lines L200 through L299 is sequentially scanned by multiplexers 300-0 to 300-9 and the signal appearing on each of these lines is applied sequentially with inverted polarity to lead 304. Assuming initially that decade counter 302-10 produces code 0000 on code leads 312, and multiplexer 300-0 is enabled via a low signal on lead 313-0 produced by assignment decoder 302-14, multiplexer 300-0 will sequentially scan lines L200 to L209 (corresponding to its input leads M00 to M09) as decade counter 302-10 produces the codes 0000 through 1001 in response to pulses from gate 306-2 during time phase $\Phi_3$.

When counter 302-10 first applies the code 1001 to leads 312, NAND gate 302-11 receives high signals at both its inputs and applies a low signal to the count input of four-bit counter 302-12. On the next pulse from gate 306-2, decade counter 302-10 changes the code on leads 312 from 1001 to 0000 causing NAND gate 302-11 to produce a high signal and increment four-bit counter 302-12. Counter 302-12 thereupon controls assignment decoder 302-14 via leads 302-13 to enable the next sequential multiplexer 300-1 (not shown) of multiplexers 300-0 through 300-9 by shifting the low enabling signal on lead 313-0 to lead 313-1 (not shown). Multiplexer 300-1 in turn scans each of lines L210 through L219 (not explicitly shown) causing any signals appearing thereon to be applied with inverted polarity to common lead 304.

Each idle line or line which has already been serviced that is scanned in this manner is pulled low during time phase $\Phi_3$ by its respective line circuit or its respective receiving line finder and thus causes a high signal to be applied to gate 306-2 by lead 304. However, this high signal does not affect the operation of gate 306-2 which continues to increment decade counter 302-10 during every time phase $\Phi_3$.

Assuming that line L266 will eventually be scanned by multiplexer 300-6, the high signal service request appearing on it eventually will be applied by multiplexer 300-5 as a low signal to common lead 304.

The low signal on lead 304 is applied to an input of NAND gate 306-2 forcing NAND gate 306-2 to produce a high signal at its output which inhibits further incrementing of decade counter 302-10.

C. Seizure of Selector S1 and Removal of Service Request Signal

The aforementioned hunting operation results in the high service request signal appearing on service requesting line L266 during time phase $\Phi_3$ being connected (with inverted polarity) to lead 304 by multiplexer 300-6. The low signal appearing on lead 304 during time phase $\Phi_3$ (which indicates that line L266 is requesting service) is also received by register 350 and prepares register 350 to return dial tone to the service requesting line as a signal to begin dialing. However, at this time, line finder LF1 advantageously performs a further series of operations which remove the service request signal from line L266 to prevent other line finders (on which line L266 might be terminated) from erroneously connecting to line L266.

Specifically, the low signal appearing on lead 304 is inverted by inverter 307-2 and applied as a high signal to the upper input of NAND gate 307-3. During time phase $\Phi_3$, the lower input to gate 307-3 is also high because it is connected to clock output $\Phi_3$, thus NAND gate 307-3 applies a low signal to the set input of set-reset flip-flop 307-1. Flip-flop 307-1 is a well-known bistable logic device which has a set (S) and a reset (R) input and two outputs, Q and $\overline{Q}$, which exhibit signals that are the inverse to each other. In the quiescent state, high signals are applied to both the S and R inputs; however, a low pulse applied to the S input, causes flip-flop 307-1 to be "set" and produce a high signal at its Q output. Similarly, a low pulse received at the R input causes flip-flop 307-1 to be "reset" and produces a high signal at the $\overline{Q}$ output.

The low signal produced by NAND gate 307-3 accordingly sets flip-flop 307-1 which in turn produces a high signal at its Q output. The high signal causes NAND gate 307-5 to pull link LK into a low state, during time phase $\Phi_3$. (The low signal at the $\overline{Q}$ output of flip-flop 307-1 is also applied to NAND gate 306-2 by lead 319 to prevent NAND gate 306-2 from restarting the aforementioned hunting operation when the service request signal on line L266 is removed as hereinafter described.)

According to one aspect of my invention, the low signal which appears on link LK during the succeeding time phase $\Phi_3$ is used to control decoder 301-6 via gates 305-2 and 302-6 to remove the service request signal from line L266. The low signal on link LK is applied to AND gate 305-2 forcing it to apply a low signal to OR gates 302-0 through 302-9. OR gates 302-0 through 302-9 control decoders 301-0 through 301-9 by means of enable leads 303-0 through 303-9.

A decoder, such as decoder 301-0, selects one of its outputs D00-D09 in accordance with the code appearing on leads 312 and produces a signal on the selected output which is in the same state as the signal on its respective enable lead. Outputs which are not selected remain in the high state. Thus, a high signal on enable leads 303-0 to 303-9 causes all decoder outputs D00-D99 to be in the high state regardless of the code signals appearing on leads 312. Decoder outputs D00-D99 are "open collector" outputs and thus only the low state is active; a "high" output is a "floating" output which will be high or low depending on other signals present on the respective line.

Decoders 301-0 through 301-9 receive the identical code inputs as multiplexers 300-0 through 300-9 via leads 312 and the same enabling signals that are applied to multiplexer enable leads 313-0 to 313-9 are applied to decoder enable leads 303-0 to 303-9 by means of OR gates 302-0 to 302-9. Using those inputs, decoders 301-0 to 301-9 are arranged to "select" the same one of lines L200-L299 as is selected by multiplexers 300-0 to 300-9. However, during the $\Phi_3$ hunting operation just described above, decoders 301-0 through 301-9 are prevented from applying any low signals to lines L200-L299 because of the presence of a high signal on link LK (flip-flop 307-1 is reset during the hunting operation) which high signal is applied through AND gate 305-2 to OR gates 302-0 through 302-9, causing them to apply high signals to leads 303-0 to 303-9 during time phase $\Phi_3$.

After the hunting operation is terminated, the low signal applied to OR gates 302-0 to 302-9 from link LK via AND gate 305-2 enables decoder 301-6 to place a low signal on its output D66, pulling line L266 low during time phase $\Phi_3$ and thus effectively removing the high service request signal.

Specifically, after the hunting operation is completed, assignment decoder 302-14 places a high signal on all its outputs DR0 to DR15 except lead DR6 which has a low signal thereon during time phase $\Phi_3$. OR gate 302-6 receives this low signal on output DR6 and the low signal from AND gate 305-2. Since all other inputs to OR gates 302-6 are clock outputs which are low during time phase $\Phi_3$, OR gate 302-6 produces a low signal on lead 303-6 enabling decoder 301-6 to produce a low signal on output D66 and thus on line L266.

Figure 4:
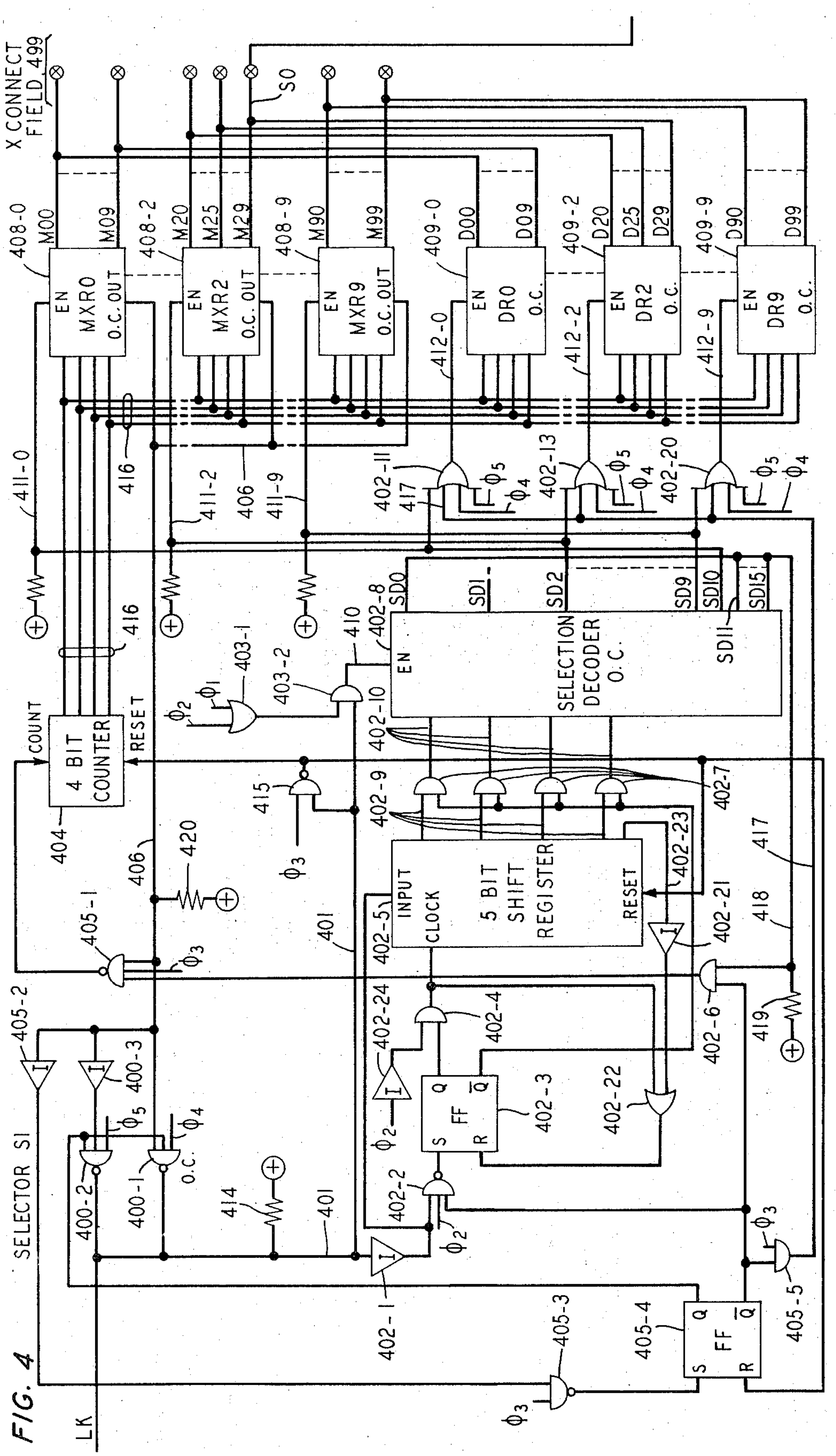
FIG. 4 is a schematic diagram of a selector which performs one stage of selection under control of a dialed digit.

At the same time that the service request signal is being removed from line L266, line finder LF1 seizes selector S1 (shown in FIG. 4). Specifically, the low signal produced on link LK during time phase $\Phi_3$ by set flip-flop 307-1 is applied, via lead 401, to NAND gate 415 in FIG. 4. This low signal prevents NAND gate 415 from applying low reset pulses to counter 404 and flip-flops 405-4 and 402-3, thereby preparing selector S1 to perform a selection under control of register 350 (FIG. 3) as hereinafter described.

All line finders are connected in a hunting chain. Since line L266 may not terminate on the first finder or finders in the chain, each finder is activated in turn until line L266 is detected. After all line finders have completed hunting operations, idle line finders are reset and the hunting operation repeated, if there are still service requesting lines that have not been detected.

In line finder LF1, the hunting chain circuitry shown in FIG. 3 of the drawing comprises gates 306-1, 317 and 318. If the preceding line finder in the chain is busy, line finder LF1 receives a high signal on lead PFB at the input of AND gate 306-1. This high signal coupled with a high signal on lead RQ (indicating a service request) causes AND gate 306-1 to apply a high signal to AND gate 318 via lead 320. AND gate 318 will be fully enabled to produce a high output to activate a succeeding line finder by a high output received from NAND gate 317 when line finder LF1 is busy or has examined all lines without detecting a service requesting line. Specifically, if line finder LF1 is busy, flip-flop 307-1 will be set and apply a low signal to the upper input of NAND gate 317 by means of lead 319 causing it to fully enable AND gate 318.

If no service requesting lines are terminated on line finder LF1, the aforementioned hunting operation will terminate with a low signal on output DR10 of assignment decoder 302-14 (during the hunting operation a low signal is sequentially placed on outputs DR0-DR9). This low signal is applied to NAND gate 306-2 via lead 316 to stop the hunting operation and to NAND gate 317, causing it to produce a high output which is forwarded by AND gate 318 to a succeeding line finder.

After all line finders in the hunting chain have operated, a high signal on lead BL of the last finder is applied to reset circuit 370 (located in the last finder). Reset circuit 370 thereupon applies a high reset pulse to lead LFR (multiplied to all line finders) during time phase $\Phi_5$ to reset all finders that are not busy. Line finder LF1 is held busy by line circuit LC266 which applies a high signal to line L266 during time phase $\Phi_5$.

This high signal is inverted by multiplexer 300-5 and applied as a low input to the upper input of NAND gate 315 via lead 304. NAND gate 315 is thereby prevented from applying low reset pulses to counters 302-10 and 302-12. If line finder LF1 were idle, of course, a high signal would appear on loead 304 during time phase $\Phi_5$. This high signal would combine with the high reset pulse on lead LFR to force NAND gate 315 to produce a low output, resetting counters 302-10 and 302-12 and returning line finder LF1 to its idle state.

D. Return of Dial Tone and Reception of Dialed Digits by the Register

After being informed of a service request by a low signal appearing on lead 304 during time phase $\Phi_3$, register 350 (in FIG. 3) prepares to receive dialed digits from station set TS266 by controlling gates 354, 355, and 309 to isolate lead 304 from link LK during time phase $\Phi_2$. This operation is necessary to prevent dialed digit information appearing on lead 304 during time phase $\Phi_2$ from passing to link LK and prematurely operating selector S1 in FIG. 4.

Specifically, register 350 places a high signal on lead 352 during time phase $\Phi_2$, thereby causing link LK to appear high. Register 350 next places a low signal on lead 353, which low signal causes AND gate 354 to apply a low signal to OR gate 355. Thus, during time phase $\Phi_2$, OR gate 355 applies a low input to NAND gate 309 effectively disabling it and isolating lead 304 from link LK.

Register 350 thereupon applies dial tone which has been digitized by a delta coder (not shon) to link LK during time phase $\Phi_4$ via lead 352. The digitized dial tone passes through AND gate 305-1 (enabled during time phase $\Phi_4$ by clock 14) and appears on output DR6 of assignment decoder 302-14. From output DR6, the coded dial tone is forwarded during time phase $\Phi_4$ to line L266 and line circuit LC266 by OR gate 302-6, lead 303-6 and decoder 301-6. The coded tone is applied to NAND gate 205-1 (FIG. 2) from line L266 via lead 214. NAND gate 205-1 receives a high signal at its other input during time phase $\Phi_4$ from gates 205-2 and 205-3. Specifically, a high signal produced by supervision logic circuit 207-3 on lead 209 is applied to AND gate 205-3. During time phase $\Phi_4$, AND gate 205-3 produces a high signal which is forwarded to NAND gate 205-1 by OR gate 205-2. Therefore, during time phase $\Phi_4$, the coded dial tone is enabled to pass through NAND gate 205-1 and AND gate 211-1 (enabled when station set TS266 went off-hook) to delta decoder 203. Delta decoder 203 converts the digitally coded dial tone to analog signals which are conveyed to station set TS266 by telephone line 217, hybrid circuit 201, line 216 and conductors T266 and R266. Station set TS266 converts the analog signals into an audible dial tone.

Upon hearing dial tone, the subscriber at station set TS266 dials the called number which in the illustrative embodiment consists of three digits, since there are one hundred lines in the system. Assume for the purposes of illustration, that the subscriber at station set TS266 desired to call the subscriber located at station set TS299 and that the called number in this case is 299. Operation of the dial in station set TS266 causes a set of dial contacts (not shown) in set TS266 to bridge and open conductors T266 and R266 to form dial pulses, which are detected by switchhook supervision circuit 207-1. Each time conductors T266 and R266 are opened, supervision circuit 207-1 closes contact 207-2, grounding lead 207A. The ground pulses are applied to NAND gate 206-1 via lead 208-1. During time phase $\Phi_2$, these pulses are gated onto line L266 by means of lead 214 and gate 206-1 in a manner similar to the way the aforementioned service request signal was gated onto line L266. The dialed information on line L266 is inverted by multiplexer 300-6 to appear on lead 304, and is detected by register 350 (FIG. 3). Register 350 stores all dialed digit information and translates each digit into a four-bit BCD code suitable for controlling selector S1 (FIG. 4).

E. Performance of First Selection Under Control of the First Dialed Digit

Register 350 prepares selector S1 for the transfer of information corresponding to the first dialed digit by placing a low enable pulse on lead 352 during time phase $\Phi_2$, which pulse propagates to selector 4 in link LK. The low pulse is inverted by inverter 402-1 in FIG. 4 and applied as a high pulse to NAND gate 402-2 and the input of shift register 402-5. Since all of the inputs to NAND gate 402-2 are high during time phase $\Phi_2$ (flip-flop 405-4 is reset, producing a high signal on its $\overline{Q}$ output) NAND gate 402-2 applies a low pulse to the set input of flip-flop 402-3. Flip-flop 402-3 is similar to flip-flop 307-1 (FIG. 3) and it is set by the low pulse at its set input. The low signal appearing at the $\overline{Q}$ output of set flip-flop 402-3 disables AND gates 402-7, isolating the outputs 402-9 of shift register 402-5 from the code inputs 402-10 of selection decoder 402-8.

The high signal at the Q output of set flip-flop 402-3 enables AND gate 402-4 to apply clock pulses during time phase $\Phi_2$ to five-bit shift register 402-5. At this time AND gate 402-4 receives a low signal at its upper input, (the high signal on clock lead $\Phi_2$ is inverted by inverter 402-24) and thus produces a low signal. At the end of time phase $\Phi_2$, clock lead $\Phi_2$ becomes low. Therefore, inverter 402-24 applies a high signal to AND gate 402-4, causing it to apply a high signal to the clock input of shift register 402-5. The low to high transition produced by AND gate 402-4 at the end of time phase $\Phi_2$, causes shift register 402-5 to shift in the high signal at its input (the high signal is produced by inverter 402-1). Shift register 402-5 had been previously reset to zero by NAND gate 415 before selector S1 was seized so that the high signal shifted into the register by the above operation appears on the topmost output, all other outputs have a low signal thereon.

Register 350 next transfers the four-bit binary code corresponding to the first dialed digit (2) to five-bit shift register 402-5 (note that the digit 0 is coded as ten in binary, 1011). One bit of the busy code (0010) is transferred during each successive time phase $\Phi_2$. Specifically, register 350 places a high or low signal corresponding to the inverse of the desired signal during time phase $\Phi_2$ on lead 352. The signal on lead 352 is forwarded via link LK, and lead 401 to inverter 402-1, where it is inverted and applied to the input of shift register 402-5 during time phase $\Phi_2$. At the end of time phase $\Phi_2$, the information at the input of register 402-5 is shifted into the register by a positive-going transition produced by gate 402-4. When each bit is shifted into shift register 402-5 the high signal which was initially shifted in the register moves down through each stage on the shift register. As the fourth bit (completing the dialed digit code) is shifted into the register by a positive-going transition at AND gate 402-4, the high signal moves into the lowermost stage of the shift register and a high signal appears on lead 402-23. This high signal is inverted by inverter 402-21 and applied as a low signal to OR gate 402-22. At this time, however, OR gate 402-22 receives a high input from the output of AND gate 402-4 and thus produces a high output. During the next time phase $\Phi_2$, clock lead $\Phi_2$ becomes high and inverter 402-24 applies a low signal to AND gate 402-4. AND gate 402-4 forwards the low signal to OR gate 402-22. Since both of its inputs are low, OR gate 402-22 applies a low signal to the R input of flip-flop 402-3. Flip-flop 402-3 is thereupon reset to produce a low signal at its Q output. This low signal disables AND gate 402-4, preventing further clock pulses from reaching shift register 402-5 and shifting the contents thereof. The high signal appearing at output $\overline{Q}$ of flip-flop 402-3 enables AND gates 402-7 connecting outputs 402-9 of shift register 402-5 to the code inputs of selection decoder 402-8. Selection decoder 402-8 operates in a similar manner to asignment decoder 302-14 (FIG. 3) which was discussed previously. Therefore, responsive to the code 0010 at its inputs 402-10, selection decoder 402-8 selects its output lead SD2.

In particular, selection decoder 402-8 receives a low signal on its enable lead 410 during time phase $\Phi_3$ from AND gate 403-2 and thus in selecting output SD2, selection decoder 402-8 places a low signal on output SD2 during time phase $\Phi_3$ which low signal enables multiplexer 408-2 via lead 411-2. Time phase $\Phi_3$ is important because selector S1 performs a hunting operation for an idle output during that phase as hereinafter described.

F. Selector Idle Output Hunting Operation

Selector S1 now proceeds to examine outputs M20-M29 which are terminated on selected multiplexer 408-2 for an idle output.

Multiplexers 408-1 to 408-10 and decoders 409-1 to 409-10 are equivalent respectively to multiplexers 300-0 to 300-9 and decoders 301-0 to 301-9 which are shown in FIG. 3 and were discussed in detail in conjunction with the description of line finder LF1. Accordingly, multiplexer 408-2 is enabled by a low signal on its enable lead 411-2 to connect its inputs M20-M29 (with inverted polarity) to common output 406 under control of signals on code leads 416. Decoder 409-2, however, responds to a high signal on its enable lead 412-2, by allowing its outputs D20-D29 to "float". (The low signal on lead SD2 of decoder 402-8 during time phase $\Phi_3$ is applied to OR gate 402-13.) However, at this time OR gate 402-13 receives a high signal from the $\overline{Q}$ output of reset flip-flop 405-4 by means of AND gate 405-5 and lead 417, and thus applies a high signal to the enable lead 412-2 of decoder 409-2 to disable decoder 409-2.

Code leads 416 are controlled by four-bit counter 404 which is sequentially incremented by low pulses applied to its clock input from the output of NAND gate 405-1. NAND gate 405-1 produces a low output when all of its inputs (including clock output $\Phi_3$) are high.

The idle output hunting operation is started when selection decoder 402-8 selects multiplexer 408-2 by moving the low signal from its output SDO (at idle, selection decoder 402-8 places a low signal on output SDO) to its output SD2. The removal of the low signal from output SD0 allows lead 418 to be pulled high by pull-up 419 and to apply a high signal to the right input of AND gate 402-6. The left input of AND gate 402-6 is provided with a high signal from the $\overline{Q}$ output of reset flip-flop 405-4, therefore AND gate 402-6 applies a high signal to NAND gate 405-1 enabling it to produce a series of low pulses during time phase $\Phi_3$ to increment counter 404. Counter 404 controls enabled multiplexer 408-2 via signals on code leads 416 to sequentially "connect" each of its inputs M20-M29 with inverted polarity to common output lead 406.

As will be hereinafter described, an idle output, such as output S0, will have a high signal thereon during time phase $\Phi_3$. When multiplexer 408-2 reaches an idle output in the hunting process, the high signal thereon will appear inverted as a low signal on lead 406. This low signal is applied to the right input of NAND gate 405-1 forcing its output high and stopping the hunting process. Assume for the purposes of illustration that output S0 is idle and is "connected" to lead 406 by this hunting process.

G. Seizure of the Connector C6

The low signal produced on lead 406 during time phase $\Phi_3$ by idle output S0 is inverted by inverter 405-2 and applied to NAND gate 405-3. During time phase $\Phi_3$, both inputs of NAND gate 405-3 are high causing it to apply a low signal to the set input of flip-flop 405-4, thereby setting flip-flop 405-4. Set flip-flop 405-4 produces a low signal at its $\overline{Q}$ output which signal is applied to AND gate 405-5 causing it to apply a low signal to OR gate 402-12 via lead 417. All of the inputs to OR gate 402-13 are low during time phase $\Phi_3$ and accordingly it produces a low signal on lead 412-2, which signal, in conjunction with the code on leads 416, causes decoder 409-2 to apply a low signal to its output D29. The low signal on output D29 pulls selector output S0 low during time phase $\Phi_3$, effectively making output S0 (and connector C6 (FIG. 5) which is connected to output S0 by means of cross-connect field 499) appear busy to other selectors which might attempt to connect to connector C6.

Figure 5:
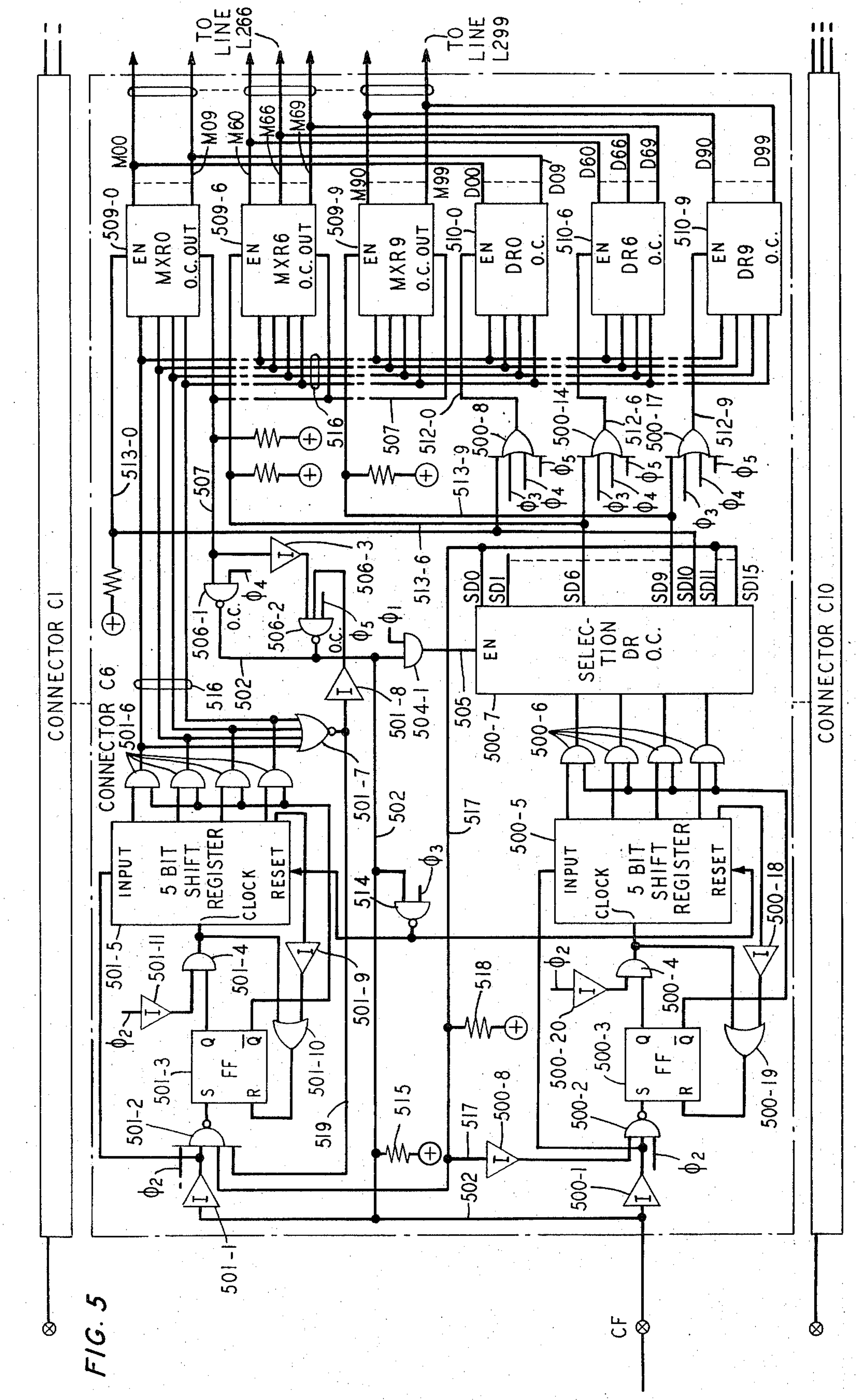
FIG. 5 shows a connector which comprises two stages of selection under control of dialed digits.

FIG. 5 shows ten connector circuits of which connector C6 is shown in detail. Connectors C1 through C10 contain circuitry equivalent to that shown for connector C6. The inputs of connectors C1-C10 may be connected to the outputs of selector S1 by cross-connect jumpers in cross-connect field 499 (shown in FIG. 4). In particular, the input CF of connector C6 is connected to the output S0 of selector S1. The low signal which is present on selector output S0 during time phase $\Phi_3$ due to set flip-flop 405-4 is applied to NAND gate 514 in connector C6 via input CF and lead 502. The low signal is applied to NAND gate 514 and forces its output high preventing gate 514 from applying low reset pulses to shift registers 500-5 and 501-5. Connector C6 is thereby seized by selector S1.

In addition to seizing connector C6, selector S1 prepares itself to pass the second and third dialed digit from register 350 to connector C6. Selector S1 also informs register 350 that the selection and hunting operations have been completed.

Specifically, the low signal produced on the $\overline{Q}$ output of set flip-flop 405-4 is applied to NAND gate 402-2 to disable it and prevent it from responding to information in time phase $\Phi_2$ which will pass through selector S1 as hereinafter described. The low signal from the $\overline{Q}$ output of flip-flop 405-4 is also forwarded through AND gate 402-6 to NAND gate 405-1, preventing gate 405-1 from restarting the aforementioned idle output hunting operation after connector C6 has been seized as described above.

Selector S1 next informs register 350 that its selection and hunting operation have been completed. The high signal on the Q output of set flip-flop 405-4 is applied to NAND gates 400-2 and 400-1. Since all of its inputs are high during time phase $\Phi_5$, NAND gate 400-2 changes its output from high to low. (The center input of NAND gate 400-2 receives a high input from inverter 400-3 due to a low signal on lead 406 during time phase $\Phi_5$. This low signal is provided by multiplexer 408-2 which receives a high signal at its input M29 from pull-up resistor 515 via lead 502 and connector input CF.)

The change from high to low during time phase $\Phi_5$ propagates via link LK and lead 351 to register 350 and informs register 350 that selector S1 has completed its hunting operation.

The high signal applied to NAND gate 400-1 from the Q output of flip-flop 405-4 enables gate 400-1 to pass digitized speech information during time phase $\Phi_4$ at a later stage of the call.

H. Operation of Connector C6 Under Control of the Second and Third Dialed Digits In response the change in polarity produced by NAND gate 400-2 during time phase $\Phi_5$, register 350 prepares connector C6 to receive coded second dialed digit information by placing a low enable signal on lead 352 during time phase $\Phi_2$. From lead 352 this low signal propagates via link LK, lead 401, AND gate 403-2 (AND gate 403-2 receives a high signal from OR gate 403-1 during time phase $\Phi_2$) and lead 410 to selection decoder 402-8. Responsive thereto, selection decoder places a low signal on lead SD2 which signal propagates via OR gate 402-12, lead 412-2, decoder 409-2 (output D29 of decoder 409-2), and selector output S0 to input CF of connector C6. The low signal during time phase $\Phi_2$ is inverted by inverter 500-1 and applied as a high signal to NAND gate 500-2 and the input of shift register 500-5. Responsive thereto, NAND gate 500-2 applies a low signal to the set input of flip-flop 500-3.

Flip-flop 500-3, five-bit shift register 500-5, and selection decoder 500-7 perform the same operations to receive and process dialed digit information as flip-flop 402-3, shift register 402-5 and selection decoder 402-8 (FIG. 4) performed to receive and process the first dialed digit. Accordingly flip-flop 500-3, after being set by a low pulse at its set input, enables AND gate 500-4 to provide clock pulses to shift register 500-5 and isolates the outputs of shift register 500-5 from the inputs of selection decoder 500-7 by means of AND gates 500-6. Also, as previously discussed, the high signal produced by inverter 500-1 is shifted into the first stage of shift register 500-5.

Register 350 next forwards four bits of information corresponding to the BCD-coded second digit (9) via link LK, lead 401, AND gate 403-2, decoder 402-8, OR gate 402-12, decoder 409-2, lead 502, and inverter 500-1 to the input of shift registdr 500-5 (each bit is forwarded during a separate time phase $\Phi_2$). Each bit is shifted into shift register 500-5 during time phase $\Phi_2$ by clock pulses produced by AND gate 500-4 (the high signal intially shifted into the register moves down as each bit is shifted into the register). After all four bits have been shifted into shift register 500-5, the high signal originally shifted into the register shifts into the lowermost stage of shift register 500-5 and is inverted by inverter 500-18 and applied as a low signal to OR gate 500-19. On the next time phase $\Phi_2$, OR gate 500-19 receives a low signal on its upper input from AND gate 500-4 and reset flip-flop 500-3 by applying a low signal to the R input. Reset flip-flop 500-3 prevents clock pulses from reaching shift register 500-5 by disabling AND gate 500-4 and places the output signals of shift register 500-5 on the code inputs of selection decoder 500-7 by enabling AND gates 500-6. Responsive to the binary code (the second digit, 9, corresponds to a binary code 1001) at its code inputs, selection decoder 500-7 selects output SD9.

Since selection decoder 500-7 is provided with a low input at its enable lead 505 during time phase $\Phi_5$ by AND gate 504-1, it places a low signal on its output lead SD10 during time phase $\Phi_5$, which low signal enables multiplexer 509-9 via lead 513-9. (Time phase $\Phi_5$ is important because it is used to monitor the busy-idle status of line L299 as hereinafter described). The low signal on selection decoder output SD10 is also applied to OR gate 500-13; however, OR gate 500-13 receives a high signal from clock 14 during time phase $\Phi_5$ and thus provides a high signal to decoder 510-9 via lead 512-9. Decoder 510-9 allows its outputs D60-D69 to "float" in response to a high signal at its enable input.

The second selection is therefore completed with multiplexer 509-9 being enabled during time phase $\Phi_5$. After the completion of the second selection, connector C6 prepares itself to perform the third selection under control of the third dialed digit. Specifically, selection decoder 500-7 in selecting output SD9 allows output SD0 and lead 517 to be pulled high by pull-up resistor 518. The high signal on lead 517 is inverted by inverter 500-8 and applied as a low signal to NAND gate 500-2, disabling it to prevent it from responding to dialed digit information which controls the third selection as hereinafter described. The high signal on lead 517 is also applied to NAND gate 501-2 in order to enable NAND gate 501-2 to set flip-flop 501-3 under control of register 350.

Register 350 prepares connector C6 to receive information corresponding to the third dialed digit by placing a low enable signal on link LK during time phase $\Phi_2$. This low enable signal passes through selector S1 to connector C6 where it controls NAND gate 501-2 to set flip-flop 501-3. Flip-flop 501-3 controls shift register 501-5 (by means of AND gate 501-4) and AND gates 501-6 in the same way that flip-flop 500-3 controlled shift register 500-5 and AND gate 500-6 during the processing of the second digit. Thus during time phase $\Phi_2$ the information bits corresponding to the third dialed digit (the digit is 9, corresponding to a binary code 1001) are shifted into shift register 501-5. After all four bits have been transferred, the high signal appearing at the lowermost stage of shift register 501-5 resets flip-flop 501-3 by means of inverter 501-9 and OR gate 510-10 causing the output of shift register 501-5 to be gated onto code leads 516 by AND gates 501-6. Responsive to the code on leads 516 (which contains at least 1 high lead), NOR gate 501-7 produces a low signal which is applied to NAND gate 501-2 via lead 519 to prevent NAND gate 501-2 from responding to any further signals appearing at the connector input CF during time phase $\Phi_2$. In addition, the low signal produced by NOR gate 501-7 is inverted by inverter 501-8 and applied as a high signal to NAND gate 506-2 enabling it to return information to register 350 as hereinafter described.

The code on leads 516 is also applied to enabled multiplexer 509-9 causing it to select its input M99. (The signals appearing on selected input M99 are applied to common lead 507 with inverted polarity by multiplexer 509-9.)

Multiplexer input M99 is connected to line L299 and line circuit LC299 (shown in FIG. 2 of the drawing.) Line circuit LC299, having circuitry equivalent to that shown for line circuit LC266, places a low signal on line L299 during time phase $\Phi_5$ to indicate that it is idle and high signal on line L299 during time phase $\Phi_5$ to indicate that it is busy. If line L299 is busy, the high signal thereon is inverted by multiplexer 509-9 and appears as a low signal on lead 507 during time phase $\Phi_5$. This low signal is inverted by inverter 506-3 and applied as a high signal to NAND gate 506-2 causing it to change its output from high to low. This change is conveyed to register 350 by means of lead 502, selector output S0, multiplexer 408-2, lead 406, inverter 400-3, NAND gate 400-2, and link LK. The signal appears at lead 351 as a low to high change, informing register 350 that line L299 is busy.

If, on the other hand, line L299 is idle, the low signal appearing thereon during time phase $\Phi_5$ is inverted by multiplexer 509-9 to appear as a high signal on lead 507, which signal is applied as a low signal to NAND gate 506-2 by inverter 506-3. A low input causes NAND gate 506-2 to keep its output in the high state during time phase $\Phi_5$. The steady high state passes through selector S1 and appears as a steady low state at lead 351 to inform registor 350 that line L299 is idle.

I. Termination of the Call

Assuming line L299 is idle, register 350 places a low pulse on lead 352 during time phase $\Phi_1$. This pulse propagates via link LK, lead 401, AND gate 403-2 (gate 403-2 is enabled during time phase $\Phi_1$ by OR gate 403-1), selection decoder 402-8, output lead SD2, OR gate 402-13, lead 412-2, decoder 409-2, selector output S0, lead 502, AND gate 504-1, selection decoder 500-7, output lead SD9, OR gate 500-17, lead 512-9, and decoder 510-9 to line L299 and line circuit LC299 in FIG. 2.

Line circuit LC299 contains circuitry which is equivalent to that shown for line circuit LC266. Accordingly, for the purposes of explanation of the illustrative embodiment during this portion of the call, it is assumed that the circuitry shown for line circuit LC266 is the circuitry contained in line circuit LC299 but not shown. Therefore, the low pulse forwarded to line L299 by register 350 during time phase $\Phi_1$ appears on lead 214 and is applied to the lower input of NAND gate 205-1. NAND gate 205-1 and NAND gate 204-1 control the transfer of information between line L299 and delta coder 202 and delta decoder 203 respectively. NAND gate 204-1 and 205-1 are themselves controlled by supervision logic circuit 207-3 by means of lead 209 and gates 204-2 to 204-4 together with inverter 205-5 and gates 205-2 to 205-4. Gates 204-1 and 205-1 allow supervision logic circuit 207-3 to control the time phase in which line circuit LC299 transmits and receives information. By placing the proper signal on lead 209 supervision logic circuit 207-3 can control gates 204-1 and 205-1 to transmit speech information in time phase $\Phi_1$ and receive speech information in time phase $\Phi_4$ or transmit speech information in time phase $\Phi_4$ and receive speech information in time phase $\Phi_1$. The ability of the line circuits to transfer information to their associated lines in different phases is necessary because the switching network only passes speech information from the selector toward the connectors in time phase $\Phi_1$ and from the connector toward the selectors in time phase $\Phi_4$. Thus each line circuit must be able to transmit and receive in phases $\Phi_1$ and $\Phi_4$ depending on whether it is the calling or called circuit.

Specifically, when line circuit LC299 is in an idle condition, supervision logic circuit 207-3 places a low signal on lead 209 which signal is inverted by inverter 205-5 and applied as a high signal to AND gates 204-4 and 205-4. During time phase $\Phi_4$, AND gate 204-4 produces a high signal which enables NAND gate 204-1 via OR gate 204-2; thus information can be transferred from delta coder 202 to line L299 during time phase $\Phi_4$. During time phase $\Phi_1$ AND gate 205-4 produces a high signal which enables NAND gate 205-1 via OR gate 205-2 allowing information on line L299 during time phase $\Phi_1$ to pass through gate 205-1. Therefore the low pulse on line L299 (produced by register 350) passes through gate 205-1 and is applied to supervision circuit 207-3 via lead 210 (the low pulse does not reach delta decoder 203 because AND gate 211-1 is disabled by a low signal on lead 211 produced by supervision logic 207-3). Responsive to the low signal on lead 210, supervision logic circuit 207-3 places a low signal on lead 208-3 disabling NAND gate 206-3. During time phase $\Phi_5$ NAND gate 206-3 allows pull-up resistor 215 to pull line L299 high, indicating that line circuit LC299 is busy.

In addition, supervision logic circuit 207-3 operates relay 212 which closes contact 212-1 connecting station set TS299 to a source of ringing voltage (not shown) common to all line circuits.

If, on the other hand, it is assumed that line L299 is busy when connector C6 connects to it (register 350 will be informed of this fact by a low to high change during time phase $\Phi_5$ on lead 351), register 350 initiates a release of selector S1 and connector C6 by placing a low signal on lead 357 during time phase $\Phi_3$. This low signal is applied to NAND gate 307-5 in line finder LF1 (FIG. 3) and causes it to apply a high signal to link LK during time phase $\Phi_3$. This high signal is applied to NAND gate 415 in selector S1 (FIG. 4). Thus during time phase $\Phi_3$, both inputs of NAND gate 415 are high causing it to produce a low signal which is applied to four-bit counter 404, five-bit shift register 402-5 and flip-flop 405-4 to reset each. Reset flip-flop 405-4 produces a high signal at its $\overline{Q}$ output, which signal is applied to lead 417 during time phase $\Phi_3$ by AND gate 405-5. The high signal on lead 417 is applied to the enable lead 412-2 of decoder 409-2 by OR gate 402-13 causing decoder 409-2 to allow its outputs to float high during time phase $\Phi_3$. In particular, selector output S0 and input CF of connector C6 are pulled high by battery feed resistor 515 in connector C6 via lead 502. The high signal on lead 502 is applied to NAND gate 514 causing it to apply low reset signals to shift registers 500-5 and 501-5 during time phase $\Phi_3$. After selector S1 and connector C6 have been released in this manner, register 350 returns delta coded busy tone to station set TS266 in the same way that dial tone was returned to station set TS266.

J. Call Answer and Disconnect

Assume again that line L299 is idle and that station set TS299 is being rung under control of supervision circuit 207-3 in FIG. 2 (assume also that line circuit LC266 is line circuit LC299 for the purposes of illustration). When the customer at station set TS299 answers, conductors T299 and R299 are bridged by a set of switchhook contacts (not shown), causing switchhook supervision circuit 207-1 to close contact 207-2 and ground lead 207A. Responsive to the ground on lead 207A, supervision logic circuit 207-3 releases relay 212 to disconnect the ringing generator (not shown) from station set TS299 via contact 212-1. In addition, supervision logic circuit 207-3 places a high signal on lead 211 to enable AND gate 211-1 to pass speech information from the output of NAND gate 205-1 to delta decoder 203.

Line circuit L299 can now transmit speech information through the network to line circuit LC266 during time phase $\Phi_4$ by the following path: line L299, input M99 of multiplexer 509-9 (FIG 5), lead 507, NAND gate 506-1, lead 502, connector input CF, cross-connect field 499, selector output S0, input M29 of multiplexer 408-2, lead 406, NAND gate 400-1, link LK, AND gate 305-1, output lead DR6 of assignment decoder 302-14, OR gate 302-6, lead 303-6, output D66 of decoder 301-6 and line L266. Likewise, the following speech path exists between line circuit LC266 and line circuit L299 during time phase $\Phi_1$: line L266, input M66 of multiplexer 300-6, lead 304, NAND gate 309, link LK, lead 401, AND gate 403-2, lead 410, output SD2 of selection decoder 402-8, OR gate 402-13, lead 412-2, output D29 of decoder 409-2, selector output S0, cross-connect field 499, connector input CF, lead 502, AND gate 504-1, lead 505, output SD9 of selection decoder 500-7, OR gate 500-17, lead 512-9, output D99 of decoder 510-9, and line L299.

At the end of the conversation between the customers at station set TS266 and station set TS299, either customer may disconnect by placing the receiver on-hook.

If, for example, the customer at station set TS266 places his receiver on-hook, thereby opening the loop formed by conductors T266 and R266, switchhook supervision circuit 207-1 opens contact 207-2 allowing pull-up resistor 213 to pull lead 207A high. A high signal on lead 207A causes supervision logic circuit 207-3 to place a high signal on lead 208-3, which high signal on lead 208-3 causes NAND gate 206-3 to pull line L266 low during time phase $\Phi_5$. A low signal on line L266 is inverted by multiplexer 300-6 and applied as a high signal to NAND gate 307-4 (via lead 304) and also to register 350 causing it to release. During time phase $\Phi_5$, NAND gate 307-4 produces a low output to reset flip-flop 307-1. Reset flip-flop 307-1 produces a low signal at its Q output, which signal is applied to NAND gate 307-5, causing it to apply a high signal to link LK during time phase $\Phi_3$. A high signal during time phase $\Phi_3$ on link LK causes shift register 402-5, counter 404 and flip-flop 405-4 in selector S1 (FIG. 4) to be reset by means of NAND gate 415. Reset flip-flop 405-4 causes shift register 500-5 and 501-5 in connector C6 (FIG. 5) to be reset by means of NAND gate 514 thus completing the release of the switching network.

On the other hand, if the customer at station set TS299 places his receiver on-hook, line circuit LC299 produces a high signal on line L299 during time phase $\Phi_5$ (as discussed above in connection with line circuit LC266) which high signal propagates to lead 351 of register 350 causing register 350 to release selector S1 and connector C6 by placing a low signal on lead 357 during time phase $\Phi_3$, which signal appears as a high signal on link LK via NAND gate 307-5. In the foregoing description certain simplifications have been made in order to clarify the description of the control circuits in the switching stages. In the illustrative embodiment shown, the control circuitry is constructed so that the information on a given lead is changed and examined on the same clock phase. For example, during time phase $\Phi_3$ (clock lead $\Phi_3$ high), NAND gate 206-2 (FIG. 2) changes the stage of the information on line L266 according to information on lead 208-2. During the same time phase NAND gate 307-3 (FIG. 3) examines line L266 (via multiplexer 300-6). In order to avoid timing errors and transient problems it is well known to divide each time phase into two parts and change information states during the first part and examine the states on the second part. A two part time phase could be easily implemented in the illustrative embodiment shown.

In the specification and drawings I have shown an illustrative switching system which can switch digital signals in a sequential manner. Each stage of the system contains a digital multiplexer and a digital decoder which are connected in parallel to provide two parallel transmission paths. Under proper control the multiplexer-decoder pair can be operated to steer the transmission paths to a selected terminal. In a line finder stage the multiplexer-decoder pair is controlled by a pair of interconnected counters and a busy idle test circuit. Another multiplexer-decoder pair is controlled by a counter and a shift register digit store to operate as a selector. Finally, two shift register digit stores control a multiplexer-decoder pair to function as a connector.

It is understood that the above described embodiment is illustrative of the application of the principles of my invention. In the light of this teaching, it is apparent that numerous other arrangements may be devised by those skilled in the art without departing from the spirit and scope of my invention. For example, other connection arrangements using the selectors and connectors herein described may be devised to accommodate various traffic loads and call capabilities. In addition, each line finder, selector, or connector may be arranged to control the multiplexer-decoder pairs contained therein with codes other than the binary code herein described to provide for non sequential enabling of multiplexer-decoder pairs. Also, for rotary telephone only, the register formations may be replaced by adding features to the line finder, selector, and connector circuits.

What is claimed is:

1. A switching stage for a multi-stage communications exchange, said stage comprising a common terminal at one side and a plurality of selectable terminals at its other side, a first digital transmission path operable during a first time phase, a second digital transmission path operable during a second time phase, and means operable during further time phases for connecting said first and said second path between said common terminal and a predetermined one of said plurality of selectable terminals.

2. A switching stage according to claim 1 wherein said stage is a line finder stage having a multiplexer in said first path, a decoder in said second path, and wherein said connecting means steers said multiplexer and said decoder to said predetermined one of said plurality of selectable terminals.

3. A line finder stage according to claim 2 wherein said connecting means includes a counter circuit operable to control said multiplexer and said decoder for selectively connecting said first and said second path to said predetermined one of said plurality of selectable terminals.

4. A line finder stage according to claim 3 wherein said first path is further operable during one of said further time phases and wherein said connecting means includes a detector circuit for monitoring said first path for digital signals travelling thereon during said one of said further time phases and for operating said counter circuit in response to said digital signals.

5. A line finder stage according to claim 3 wherein said connecting means further includes means for connecting said common terminal to said first path during said first time phase and means for connecting said second path to said common terminal in said second time phase.

6. A switching stage according to claim 1 wherein said stage is a selector stage having a plurality of multiplexers in said first path, and a plurality of decoders in said second path, said decoders being paired with said multiplexers, and wherein said connecting means selects and connects a pair of said multiplexers and said decoders to said predetermined one of said plurality of selectable terminals.

7. A selector stage according to claim 6 wherein said connecting means includes means responsive to digital signals travelling on said first path for selectively enabling one pair of said multiplexers and said decoders.

8. A selector stage according to claim 7 wherein said connecting means includes means controllable to operate said enabled pair of said multiplexers and said decoders to connect said first path and said second path to said predetermined one of said plurality of selectable terminals, and said connecting means further includes test means responsive to digital signals travelling in said second path during one of said further time phases for controlling said means for operating said enabled pair of said multiplexers and said decoders.

9. A switching stage according to claim 1 wherein said stage is a connector stage having a plurality of multiplexers in said first path, and a plurality of decoders in said second path, said decoders being paired with said multiplexers, and wherein said first path is further operable to transmit digital signals during one of said further time phases and said connecting means includes means responsive to said digital signals for selectively enabling one pair of said multiplexers and said decoders, and means responsive to further digital signals travelling on said first path during said one of further time phases for operating said enabled pair of said multiplexers and said decoders to connect said first path and said second path to said predetermined one of said plurality of selectable terminals.

10. A digital progressive switching system having a plurality of stages for selectively establishing connections between calling and called telephones for the transmission of digitally encoded speech signals therebetween in speech information phases of a recurrent sequence of time phases, said system comprising, line finder means for detecting a service request from a calling one of said telephones in a supervisory phase of said sequence of time phases, and selector switch means having a plurality of output circuits and steering means comprising intermediate means operative in supervisory phases of said sequence for selecting an idle one of said output circuits and means for establishing digital connection paths between said line finder and said selected idle output circuit in said speech information phases of said sequence.

11. A digital progressive switching system in accordance with claim 10 further comprising connector switch means connected to said output circuits, said connector switch means including terminating means for selecting, in said supervisory phases, a called one of said telephones and means for further extending said digital connection paths to said selected called telephone in said speech information phases.

12. A digital progressive switching system in accordance with claim 10 wherein said digital connection path establishing means comprises a plurality of paired digital multiplexers and digital decoders, a common decoder circuit having a plurality of outputs, each of said outputs being connected to enable one pair of said plurality of paired multiplexers and decoders, and means for enabling said common decoder circuit.

13. A digital progressive switching system in accordance with claim 12 further comprising a source of clock pulses and wherein said intermediate means comprises a counter for counting said clock pulses said counter having a plurality of output leads, and means connecting said counter output leads to each of said digital multiplexers and digital decoders, whereby said counter controls said digital multiplexers and said digital decoders sequentially to connect said line finder means to said selector switch output circuits.

14. A digital progressive switching system in accordance with claim 13 further comprising a busy-idle test circuit, responsive to busy signals from said output circuits in said supervisory phase of said sequence of time phases for connecting said clock pulse source to said counter, and responsive to idle signals from said output circuits in said supervisory phase of said sequence of time phases for disconnecting said clock pulse source from said counter.

15. A digital progressive switching system in accordance with claim 11 further comprising register means for processing call signaling information received from said calling telephone over said digital connection paths and for controlling said selector switch means and said connector switch means in response to processed call signaling information, said register means prefixing said processed call signaling information with an enable signal in order to enable said connector switch and said selector switch to respond to said processed call signaling information.

16. A digital progressive switching system in accordance with claim 15 wherein said intermediate selecting means and said terminating selecting means further include digit store means, controllable for receiving said processed call signaling information and for operating said selector switch and said connector switch means, means responsive to said enable signal for controlling said digit store means, and means for disabling said digit store after said processed call signaling information has been received.

17. A digital progressive switching system for selectively establishing connections between calling and called telephone comprising clock means defining a repetitive sequence of time phases, a line circuit connected to each of said telephones, each of said line circuits including an output lead, means for digitally coding speech and supervisory signals, decoding means, and means for applying the digitally coded speech and supervisory signals to said line circuit output lead in selected ones of said phases, line finder means for detecting a service request from a calling one of said line circuits, said line finder means comprising means for examining said line circuit output leads in a first of said time phases to detect service request signals thereon, and an output lead, and means for establishing a digital connection path between a detected line circuit output lead and said line finder output lead, and selector switch means connected to said line finder output lead and having a plurality of output circuits, said output circuits being arranged in a plurality of groups, said selector switch means including means responsive to call signaling information in another of said time phases for selecting one of said groups of output circuits, means for testing each output circuit in said selected group in a third of said time phases to detect an idle output circuit, and means for connecting digitally coded speech signals from said line finder output lead to said idle output circuit in others of said time phases.

18. A digital progressive switching system in accordance with claim 17 further comprising connector switch means connected to said selector switch means output circuits, said connector switch means including output conductors connected to said line circuits, said output conductors being arranged in a plurality of groups, and means responsive to call signaling information in one of said time phases for selecting one of said plurality of output conductor groups and one output conductor of said selected group and for connecting in said others of said time phases said selected selector switch means output circuit to said selected connector switch means output conductor.

19. In a register controllec progressive switching system for switching digital signls wherein a registered digital code selects a communication link, a hunting arrangement for automatically connecting said communication link to a further idle communication channel selected from a plurality of communication channels, said arrangement comprising, a busy-idle test circuit for monitoring the busy and idle status of said plurality of communications channels, a multiplexer controllable to connect said plurality of communications channels one at a time to said busy-idle test circuit, a counter operated by said busy-idle test circuit for controlling said multiplexer to advance from one of said channels to the next channel if said test circuit detects a busy status and to stop if said busy-idle circuit detects an idle status, means for disabling said busy-idle test circuit when an idle communication channel is detected, and means including said multiplexer for connecting said idle communication channel to said selected communication link to permit digital signals to be transmitted therethrough.

20. A line finder for a digital progressive switching system, said line finder comprising digital multiplexer means having an input respective to each of a plurality of lines to be found and an output, said lines being capable of temporarily exhibiting a service request signal to be found by said finder, a counter connected to said multiplexer means for causing said multiplexer means sequentially to connect one of its inputs to said output for each count of said counter, a detector connected to said output and responsive to the appearance thereon of a service request signal for inhibiting said counter from generating any further counts, and a busy-idle test circuit connected to said output and responsive to the appearance thereon of said service request for preventing said service request detector from restarting said counter when said service request signal is removed from said output.

21. A line finder according to claim 20 further comprising a decoder having a plurality of outputs corresponding to each of the inputs of said multiplexer means and a decoder input, and wherein said busy-idle tester applies a signal to said decoder input of such polarity so as to cancel out said service request signal applied by said line to said multiplexer means input when said service request signal has been detected by said detector.

22. A selector switch for a digital progressive switching system, said selector switch comprising, a plurality of multiplexers, each multiplexer being associated with a group of lines to be selected and each multiplexer having an output and an input respective to each line within said associated group of lines, said lines each being capable of exhibiting a busy and an idle status, means responsive to call signaling information received at said selector input for selectively enabling one of said plurality of multiplexers, a counter for controlling said enabled one of said multiplexers to connect one of its inputs to said output for each count of said counter, and a busy-idle tester connected to said output and responsive to an idle status exhibited thereon for inhibiting said counter from generating any further counts.

23. A selector switch according to claim 22 wherein said means responsive to call signaling information includes a shift register connected to said selector input for receiving and storing said call signaling information and further includes a selection decoder responsive to information stored in said shift register for selectively enabling one of said plurality of multiplexers.

24. A selector switch according to claim 22 further comprising a plurality of decoders, each decoder being paired with one of said multiplexers and having a plurality of decoding outputs corresponding to each of said inputs of the multiplexer paired therewith, means responsive to the detection of an idle status on one of said lines for controlling the decoder paired with said enabled multiplexer to produce a busy signal on one of its decoder outputs so as to change said idle status of said line to a busy status.

25. A connector switch for a digital progressive switching system, said connector switch comprising a connector input, a plurality of multiplexers, each multiplexer being associated with a group of lines to be selected and each multiplexer having an output and an input respective to each line within said associated group of lines, first means responsive to call signaling information received at said connector input for selectively enabling one of said plurality of multiplexers, second means responsive to call signaling information received at said connector input for causing said enabled multiplexer to establish a digital connection path between a predetermined line and said output, and allotter means for disabling said first means after one of said multiplexers has been enabled to prevent said first means from responding to further call signaling information, said allotter means thereupon enabling said second means to respond to said further call signaling information.

26. A connector switch according to claim 25 further comprising a decoder paired with each of said plurality of multiplexers, each decoder having a decoder input and a plurality of decoder outputs, said decoder paired with said enabled multiplexer being controlled by said first and said second means to connect said predetermined line to its decoder input, and means for connecting said connector input to said output of said enabled multiplexer and to said input of said paired decoder to form a two-way transmission path therebetween.

* * * * *

UNITED STATES PATENT OFFICE
CERTIFICATE OF CORRECTION

PATENT NO. : 3,860,761

DATED : January 14, 1975

INVENTOR(S) : John F. O'Neill, Jr.

It is certified that error appears in the above-identified patent and that said Letters Patent are hereby corrected as shown below:

Patent Office Errors

In the Abstract, line 9, change "fingers" to --finders--.
Column 3, line 16, change "signals" to --finders--.
Column 7, line 21, change "101" to --Φ--.
Column 11, line 4, change "hase" to --phase--.
Column 15, line 6, change "loead" to --lead--.
Column 15, line 60, change "desired" to --desires--.
Column 19, line 59, change "registdr" to --register--.
Column 21, line 33, change "registor" to --register--.
Column 27, line 55, change "controllec" to --controlled--.
Column 27, line 56, change "signls" to --signals--.

Applicant's Errors

Column 19, line 63, change "intially" to --initially--.

Signed and sealed this 15th day of July 1975.

(SEAL)
Attest:

RUTH C. MASON
Attesting Officer

C. MARSHALL DANN
Commissioner of Patents
and Trademarks